Figure 1:
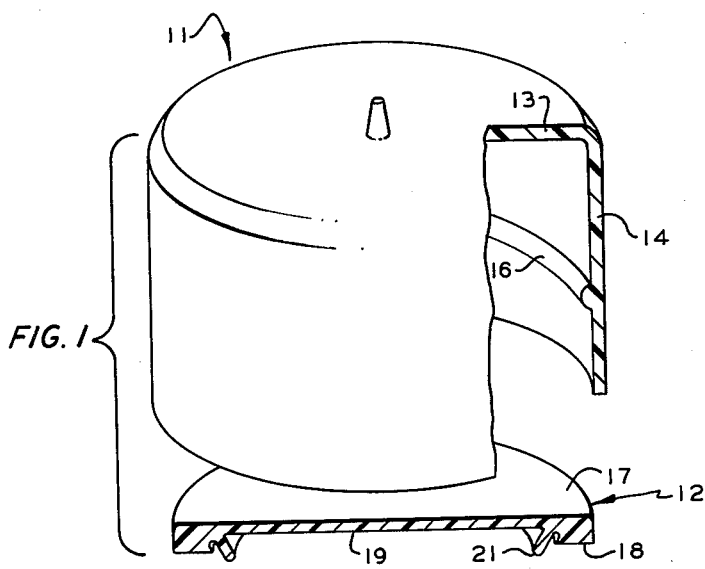

Aug. 31, 1965    J. N. SCOTT, JR., ET AL    3,203,572
VENTING-TYPE CLOSURE ASSEMBLY
Filed Dec. 31, 1962

INVENTORS
J.N. SCOTT, JR.
P. J. BOEKE
BY
ATTORNEYS

United States Patent Office 3,203,572
Patented Aug. 31, 1965

3,203,572
VENTING-TYPE CLOSURE ASSEMBLY
John N. Scott, Jr., and Paul J. Boeke, Bartlesville, Okla., assignors to Phillips Petroleum Company, a corporation of Delaware
Filed Dec. 31, 1962, Ser. No. 248,414
5 Claims. (Cl. 215—56)

This invention relates to a venting-type closure assembly formed from a conventional cap and an insert of unusual geometry. In still another aspect it relates to forming a venting-type closure cap as an integral unit for semi-rigid containers.

The use of semi-rigid containers, typically of the type blow molded from olefin polymers is plagued in certain applications, by the deficiency known as vacuum collapse. This phenomenon occurs with certain kinds of stored products where a vapor pressure within the container develops which is lower than ambient pressure. This may occur by any one of several mechanisms such as seepage of the product through the container wall, solution of trapped air in the stored liquid, or the absorption of a portion of the stored product by the container wall. Whatever the mechanism, many products are precluded from storage in semi-rigid plastic formed containers because of this failing.

It would appear that a solution lies in a closure member with the unique feature of permitting ambient air to seep into the container when a pressure differential develops, but at the same time, such a member must prevent the escape of container contents, even if liquid.

The present invention, in one embodiment, is directed to a novel insert of a resilient material that is readily adapted for substitution in conventional bottle caps in place of the usual cork or rubber gasket, and is characterized by an annular inwardly inclined lip adapted for normal sealing with the inner surface of the neck of the container. It has been found to do an effective job of protecting the contents from leakage, and simultaneously permitting air to enter the container, as needed, to maintain pressure on the inside wall of the container substantially at ambient pressure.

Having discovered an effective configuration for a closure cap assembly but entailing a separate novel insert which accomplishes the desired objects, it is much to be preferred for reasons of convenience of handling and economy of manufacture that the novel cap be fabricated as an integral piece. However, a cap with a molded in place, annular, inwardly inclined lip presents major production problems, since it is difficult to strip such a molded lip section from between the metal sides of the inclined lip section of the mold cavity.

In the second embodiment of the closure member of this invention in forming as an integral piece, there is further provided a novel injection molding apparatus adapted to permit the inclined lip to be freed without stress as the molded cap is being stripped from the opened mold. This result is accomplished by taking the core of a two-section injection mold die and modifying it as will be described. The core section is provided with an axially movable center section, which is O-ring biased in the seated position during melt injection and freezing, but the center section is actuatable to move inwardly of the mold cavity a limited distance, simultaneously with the stripping of the formed cap from the core section, thus minimizing any shearing stress being placed on the inclined lip portion of the cap, as it is ejected.

Figure 2:
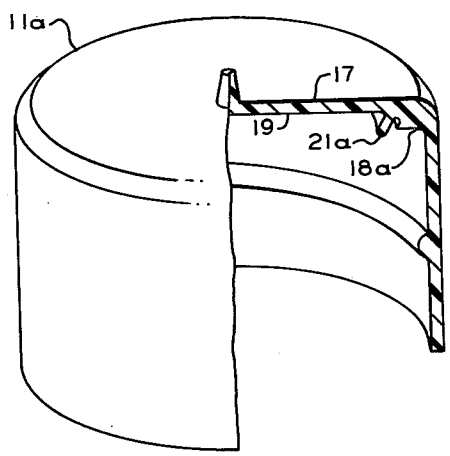

A more complete understanding of the invention may be had by reference to the accompanying drawing, wherein like parts have been designated with like reference numerals, of which FIGURE 1 is a perspective view in partial section of the novel closure cap assembly of this invention;

FIGURE 2 is a perspective view, in partial section, of another embodiment of the closure cap of this invention.

Referring now to FIGURE 1, in particular, there is shown a venting-type closure cap assembly comprising a conventional cap, generally designated 11, and an insert of novel configuration, generally designated 12. Cap 11 comprises a central portion 13 of sufficient thickness to give it rigidity, and a peripheral skirt 14, also of sufficient thickness to give it rigidity, extending downwardly from the central portion, and adapted to enclose the outer surface of the neck of a container (not shown). Disposed on the inner surface of skirt 14 is an annular bead 16 defining a spiral of at least one turn adapted to take up said cap assembly by engaging a similar spiral on the upper neck of a container (not shown).

Insert 12 is formed of a resilient material to be used with said cap for sealing the container. It comprises a central base portion 17, the upper portion of which is adapted to seat tightly within cap 11, and may be fixed therein by heat sealing or the use of a suitable adhesive. A generally flat annular projection 18 is disposed adjacent the periphery of the lower surface 19 and thus positioned to contact the upper rim of the container. An annular, inwardly inclined lip 21 is disposed adjacent lower surface 19 but spaced from projection 18, the lip being further adapted for normal contact with the inner edge of the upper rim of the container.

In FIGURE 2, the closure member 11a is shown as an integral piece. All of the elements of the cap are the same as in FIGURE 1, except that no separate insert like 12 is required. Rather, flat projection 18a and lip 21a are molded into the cap on the under surface during the fabrication of cap 11a.

The process of the present invention is applicable to substantially all of the thermoplastic normally solid polymers and resins, such as the polyolefins, and especially high density polyethylene, ranging between 0.960 and 0.980 for articles of good durability. In general, any solid polymer of an aliphatic mono-1-olefin can be used within the scope of this invention. Examples of such starting materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic containers having particularly desirable properties. Homopolymers and copolymers, as well as mixtures of homopolymers and copolymers are suitable polymeric materials for the articles of the invention.

The polyolefins, especially polyethylenes, that can be employed in the practice of the present invention can be prepared by any of the methods which are usually employed for the preparation of these polymers. The high density polyolefins prepared by the low pressure processes now known are useful in the preparation of the container type articles of the invention. However, the invention is also applicable to the lower density polyolefins as well.

Suitable apparatus for molding the venting-type closure assembly of this invention is disclosed and claimed in our copending application Serial No. 371,581, filed June 1, 1964.

Reasonable variation and modification are possible within the scope of the foregoing disclosure, the drawing and the appended claims to the invention.

We claim:
1. A venting-type closure cap assembly for semi-rigid containers comprising:
  (a) A cap having:
    (1) A central portion, and
    (2) A peripheral skirt extending downwardly from the central portion and adapted to enclose the outer surface of the neck of a container;

(b) An insert formed of a resilient material to be used with said cap for sealing said container comprising:
 (1) A central base section, the upper surface of which is adapted to seat tightly within said cap;
 (2) A generally flat annular projection disposed adjacent the periphery of the lower surface of said base section and positioned to contact the upper rim of said container;
 (3) An annular inwardly inclined lip disposed adjacent and depending from said lower surface and spaced from said projection, and further adapted for normal contact with the inner edge of the upper rim of said container; and (c) An annular bead on the inner surface of said peripheral skirt defining a spiral of at least one turn adapted to take up said cap assembly, contact said annular projection of said insert on said upper rim, and provide a path for air to enter said container.

2. A venting-type closure cap for semi-rigid containers comprising:
 (a) a central base portion;
 (b) a peripheral skirt extending downwardly from the central portion and adapted to enclose the outer surface of the neck of a container;
 (c) a generally flat annular projection disposed adjacent the periphery of the lower surface of said base section and positioned to contact the upper rim of said container;
 (d) an annular inwardly inclined lip disposed adjacent and depending from said lower surface and spaced from said projection, and further adapted for normal contact with the inner edge of the upper rim of said container; and
 (e) an annular bead on the inner surface of said peripheral skirt defining a spiral of at least one turn adapted to take up said cap assembly, contact said annular projection on said upper rim, and provide a path for air to enter said container.

3. The cap assembly of claim 1 wherein said resilient material is polyethylene.

4. The cap of claim 2 which is fabricated from polyethylene.

5. An insert for a conventional closure cap formed of a resilient material comprising:
 (1) A central base section, the upper surface of which is adapted to seat tightly within said cap;
 (2) A generally flat annular projection disposed adjacent the periphery of the lower surface of said base section and positioned to contact the upper rim of said container;
 (3) An annular inwardly inclined lip disposed adjacent and depending from said lower surface and spaced from said projection, and further adapted for normal contact with the inner edge of the upper rim of said container.

References Cited by the Examiner

UNITED STATES PATENTS

| 2,768,762 | 10/56 | Guinet | 215—41 |
| 2,890,488 | 6/59 | Gemberling | 18—42 |
| 2,914,805 | 12/59 | Morn | 18—42 |
| 3,072,277 | 1/63 | Hoffmann | 215—41 |

FOREIGN PATENTS

| 62,360 | 6/55 | France. |
| | | (1st addition to 1,054,118) |
| 62,853 | 6/55 | France. |
| | | (2nd addition to 1,054,118) |
| 1,050,249 | 1/54 | France. |

FRANKLIN T. GARRETT, *Primary Examiner.*

EARLE J. DRUMMOND, *Examiner.*